(12) United States Patent
Anderson et al.

(10) Patent No.: US 11,331,624 B2
(45) Date of Patent: *May 17, 2022

(54) ARTICLE OF MANUFACTURE FOR SECURING A CATALYST SUBSTRATE

(71) Applicant: Cummins Emission Solutions Inc., Columbus, IN (US)

(72) Inventors: Matthew Anderson, Columbus, IN (US); Arpad Somogyvari, Indianapolis, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,730

(22) Filed: Aug. 2, 2019

(65) Prior Publication Data

US 2019/0351371 A1   Nov. 21, 2019

Related U.S. Application Data

(60) Continuation of application No. 15/704,540, filed on Sep. 14, 2017, now Pat. No. 10,406,481, which is a
(Continued)

(51) Int. Cl.
*B32B 3/28* (2006.01)
*F01N 3/28* (2006.01)
(Continued)

(52) U.S. Cl.
CPC .............. *B01D 53/86* (2013.01); *B01J 21/02* (2013.01); *B01J 31/06* (2013.01); *B01J 35/0006* (2013.01);
(Continued)

(58) Field of Classification Search
None
See application file for complete search history.

(56) References Cited

U.S. PATENT DOCUMENTS 3,254,966 A   6/1966   Bloch et al.
4,461,323 A   7/1984   Morikawa et al.
(Continued)

FOREIGN PATENT DOCUMENTS

DE              34 15 075 A1   11/1985
DE   10 2005 024 124 A1        11/2006
(Continued)

OTHER PUBLICATIONS

Search Report and Written Opinion for PCT/US2014/017953, dated May 21, 2014, 12 pages.
(Continued)

*Primary Examiner* — Sheng H Davis
(74) *Attorney, Agent, or Firm* — Foley & Lardner LLP

(57) ABSTRACT

An aftertreatment component for use in an exhaust aftertreatment system. The aftertreatment component comprises an aftertreatment substrate and a compressible material. The compressible material may be formed from a plastic thermoset, a rubberized material, or a metal foil which permits for the selective expansion of the substrate within the compressible material, while also reducing cost and manufacturing complexity. In various embodiments, the aftertreatment substrate and the compressible materials may be formed separately and coupled to each other, or they may be formed concurrently via coextrusion.

17 Claims, 2 Drawing Sheets

Related U.S. Application Data division of application No. 14/769,698, filed as application No. PCT/US2014/017953 on Feb. 24, 2014, now Pat. No. 9,764,282.

(60) Provisional application No. 61/770,305, filed on Feb. 27, 2013.

(51) Int. Cl.
| | |
|---|---|
| *B01D 53/86* | (2006.01) |
| *F01N 3/021* | (2006.01) |
| *B01J 21/02* | (2006.01) |
| *B01J 31/06* | (2006.01) |
| *B01J 35/00* | (2006.01) |
| *B01J 35/02* | (2006.01) |
| *B01J 37/00* | (2006.01) |
| *B01J 37/02* | (2006.01) |
| *B32B 15/08* | (2006.01) |

(52) U.S. Cl.
CPC ........... *B01J 35/02* (2013.01); *B01J 37/0009* (2013.01); *B01J 37/0217* (2013.01); *B32B 3/28* (2013.01); *B32B 15/08* (2013.01); *F01N 3/0211* (2013.01); *F01N 3/2842* (2013.01); *F01N 3/2853* (2013.01); *F01N 3/2875* (2013.01); *B01D 2255/9025* (2013.01); *B01J 2231/005* (2013.01); *B01J 2531/002* (2013.01); *B01J 2531/008* (2013.01); *F01N 2330/20* (2013.01); *Y02T 10/12* (2013.01)

(56) References Cited

U.S. PATENT DOCUMENTS

| | | | | |
|---|---|---|---|---|
| 4,617,176 | A * | 10/1986 | Merry | .................... F01N 3/2857 422/179 |
| 4,976,103 | A | 12/1990 | Takikawa et al. | |
| 4,986,223 | A * | 1/1991 | Mahoney | .................... F28D 9/04 123/25 B |
| 5,380,501 | A | 1/1995 | Hitachi et al. | |
| 5,486,338 | A | 1/1996 | Ota et al. | |
| 5,557,847 | A | 9/1996 | Koshida et al. | |
| 5,611,832 | A * | 3/1997 | Suzuki | ............... B01D 39/2044 55/523 |
| 5,645,781 | A * | 7/1997 | Popovic' | ................. C04B 35/80 264/172.15 |
| 6,066,228 | A * | 5/2000 | Brunson | .................... B01J 35/04 156/294 |
| 6,317,976 | B1 | 11/2001 | Aranda et al. | |
| 6,368,726 | B1 | 4/2002 | Holpp et al. | |
| 7,404,254 | B2 * | 7/2008 | Kurth | ...................... F01N 3/281 29/890 |
| 7,587,819 | B1 * | 9/2009 | Hall, Jr. | ................. B21K 25/00 228/181 |
| 7,943,096 | B2 | 5/2011 | Kurth et al. | |
| 2003/0101701 | A1 | 6/2003 | Henrichsen et al. | |
| 2003/0118856 | A1 | 6/2003 | Hsu | |
| 2004/0156761 | A1 | 8/2004 | Bruck et al. | |
| 2004/0266619 | A1 * | 12/2004 | Bernas | .................... B29C 48/32 428/116 |
| 2006/0130451 | A1 | 6/2006 | Ding et al. | |
| 2008/0118700 | A1 | 5/2008 | Tsuchiya et al. | |
| 2009/0104091 | A1 | 4/2009 | Hoppenstedt et al. | |
| 2009/0113709 | A1 | 5/2009 | Mueller et al. | |
| 2010/0203238 | A1 | 8/2010 | Magno et al. | |
| 2011/0150715 | A1 * | 6/2011 | Kumar | .................... B32B 27/02 422/168 |
| 2012/0039756 | A1 | 2/2012 | Beauharnois | |
| 2012/0222767 | A1 | 9/2012 | Wikaryasz et al. | |
| 2012/0241391 | A1 | 9/2012 | Carlson et al. | |
| 2018/0283252 | A1 | 10/2018 | Okabe et al. | |

FOREIGN PATENT DOCUMENTS

| | | |
|---|---|---|
| WO | 9216362 * | 10/1992 |
| WO | WO-01/00304 | 1/2001 |
| WO | WO-2011/029481 A1 | 3/2011 |

OTHER PUBLICATIONS

Office Action issued for German Patent Application No. DE 112014001018.9 dated Jan. 27, 2022, 6 pages.

* cited by examiner

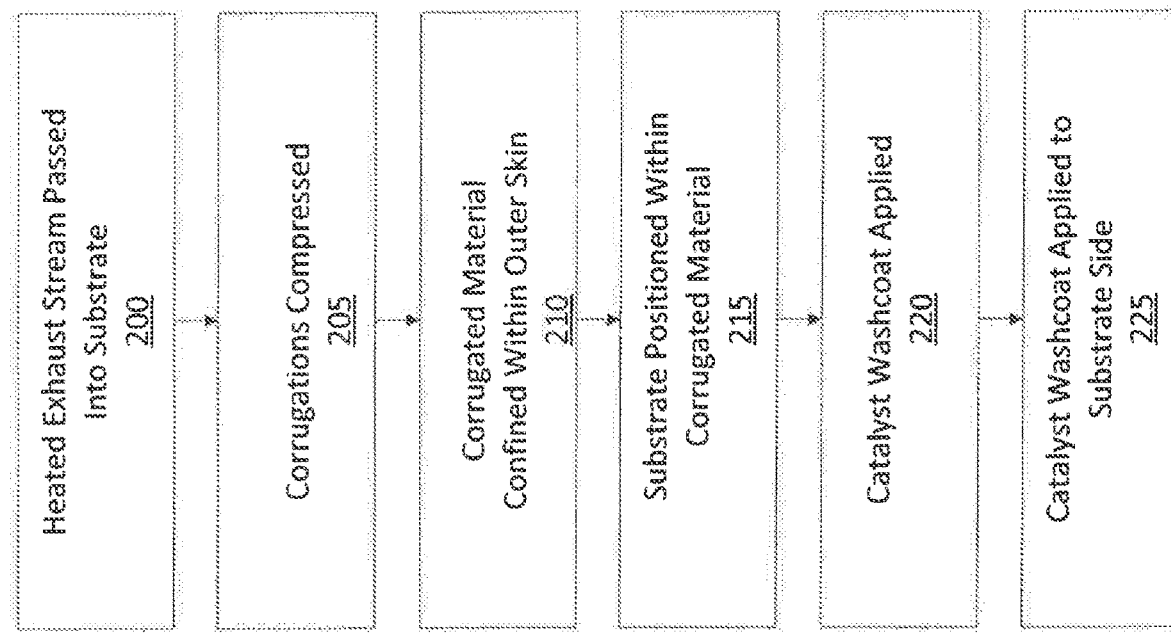

ARTICLE OF MANUFACTURE FOR SECURING A CATALYST SUBSTRATE

CROSS-REFERENCE TO RELATED APPLICATIONS

The present application is a Continuation of U.S. patent application Ser. No. 15/704,540, filed Sep. 14, 2017, which is a Divisional of U.S. patent application Ser. No. 14/769,698, filed Aug. 21, 2015, which is National Stage of PCT Application No. PCT/US2014/017953, filed Feb. 24, 2014, which claims priority to U.S. Provisional Patent Application No. 61/770,305 filed Feb. 27, 2013. The contents of these applications are incorporated herein by reference in their entireties.

BACKGROUND

Known catalyst substrate articles for engine aftertreatment systems include a catalyst substrate material wrapped in a ceramic fiber mat, which is then encased in a metal shell or skin. The catalyst substrate material may be a ceramic material, such as cordierite or silicon carbide. Catalyst components are known to suffer damage from thermal stresses, for example from temperature expansion differences between the substrate material and the housing material. The use of a ceramic fiber mat allows for expansion of the substrate within the housing, but introduces significant cost, manufacturing complexity, and provides for wasted space in the catalyst housing that cannot participate in active treatment of gases within the housing. Therefore, further technological developments are desirable in this area.

SUMMARY

Various embodiments provide for an improved aftertreatment component of an exhaust aftertreatment system, comprising an aftertreatment substrate, particularly a catalyst substrate, and a compressible material coupled to an outer surface of the aftertreatment substrate. The compressible material may comprise, for example, a corrugated material, a metal foil, a polymer-based thermoset, or a rubberized material. A catalyst washcoat may be disposed on the aftertreatment substrate, and more particularly on a substrate side of the compressible material. An outer skin may define the compressible material, with the outer skin at least partially compressing the compressible material and applying a selected closure force to the substrate through the compressible material. The compressible material may be in tension, with corrugations in the compressible material being at least partially compressed. The compressible material may apply a selected closure force to the substrate.

Various embodiments directed to methods for manufacturing an improved aftertreatment component of an exhaust aftertreatment system are provided. According to one method, a heated exhaust stream is passed into an aftertreatment substrate, particularly a catalyst substrate. The aftertreatment substrate is expanded into a compressible material defining the aftertreatment substrate. As a result of thermally expanding the aftertreatment substrate into the compressible material defining the aftertreatment substrate, the compressible material is at least partially compressed. A catalyst washcoat may be applied to the aftertreatment substrate, and more particularly to a substrate side of the compressible material. As an alternative to the above, the aftreatment substrate and the compressible material may be concurrently formed and coupled together via coextrusion.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 2 is a flow chart showing an exemplary process which an aftertreatment component may be manufactured in accordance with various embodiments.

DESCRIPTION OF ILLUSTRATIVE EMBODIMENTS

Figure 1:
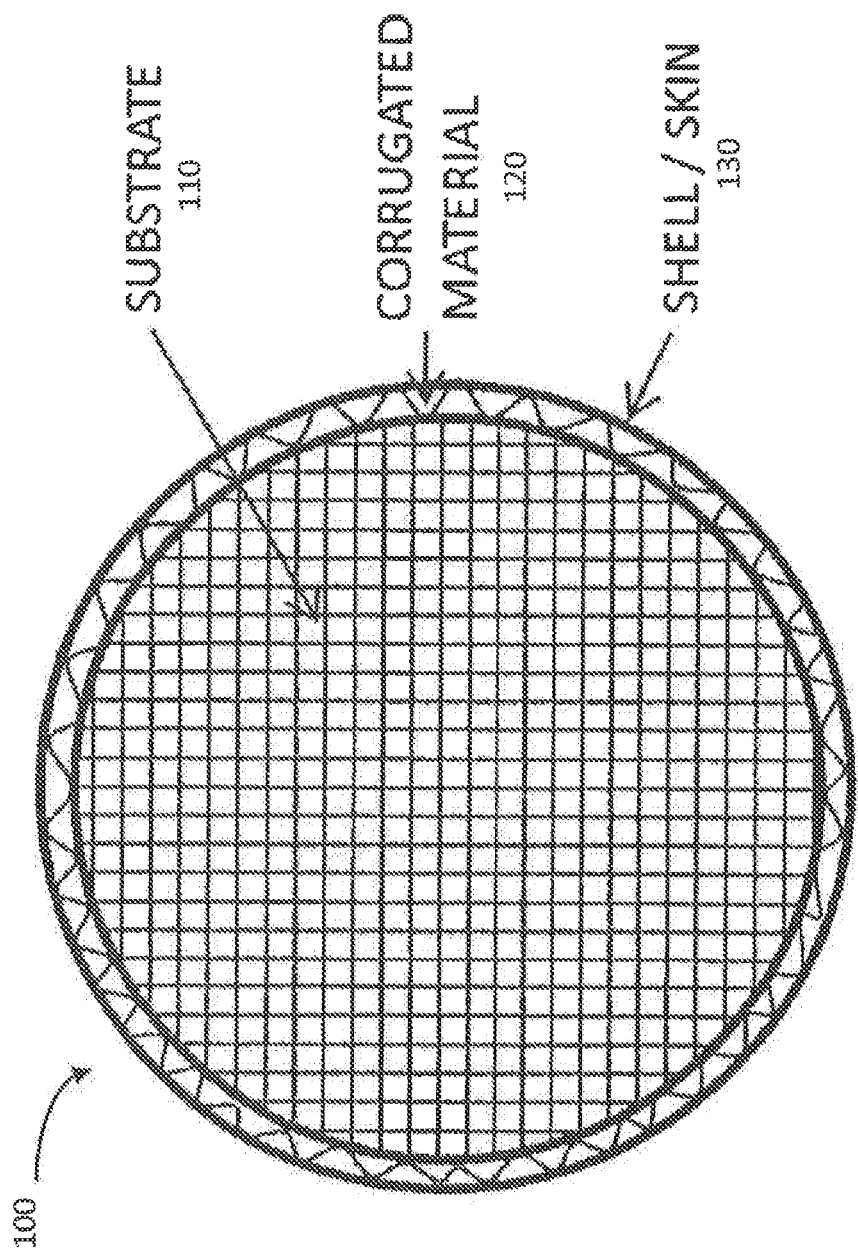
FIG. 1 is a cross-sectional view of an aftertreatment component constructed in accordance with various embodiments.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an aftertreatment component 100 of an exhaust aftertreatment system is depicted including a cylindrical aftertreatment substrate material 110 and a compressible material 120 coupled to the cylindrical aftertreatment substrate material 120. It should be recognized that, a corrugated material is specifically mentioned in various locations herein, the arrangement is also applicable to other compressible materials as discussed herein. Therefore, it should be understood that embodiments contained herein that refer to corrugated materials should be understood as applying to other non-corrugated, compressible materials as well. The outer surface of the compressible material 120 is defined by a shell or skin 130. The cylindrical aspect of the aftertreatment substrate material 110 should be understood broadly, and can refer to a cylindrical shape having any cross-section, including a changing or variable cross-section. Example and non-limiting cross-sections include circular (as depicted in FIG. 1), square, elliptical, and/or rectangular cross-sections. The aftertreatment component 100 may form a portion of any aftertreatment component understood in the art. In certain embodiments, the aftertreatment component may be a substrate for an oxidation catalyst, a particulate filter, a $NO_x$ treatment catalyst (e.g. $NO_x$ adsorber and/or selective reduction catalyst—SRC), an ammonia oxidation catalyst, a three-way catalyst, and/or a four-way catalyst.

A particulate filter, where present, may be a partial flow or full flow (e.g. through-flow or wall-flow) component. Any aftertreatment component may be catalyzed or uncatalyzed. An example embodiment includes a catalyzed aftertreatment component which is subject to a designed operating temperature range which exceeds several hundred degrees C.—example a $T_{max}$ minus $T_{min}$ which exceeds 200° C., 300° C., 400° C., 500° C., or more. In another example, the maximum temperature of the aftertreatment component exceeds 500° C., 600° C., 700° C., or more. An example embodiment includes a catalyzed diesel particulate filter (DPF), and an additional or alternate example includes a diesel oxidation catalyst and/or a close-coupled catalyst. A close-coupled catalyst, as used herein, should be understood broadly to include any catalyst specifically positioned to preserve exhaust gas temperatures at the catalyst position, and can include physical close coupling (e.g. moving the catalyst toward or even upstream of a turbocharger) and/or thermal close coupling (e.g. insulating the exhaust manifold, turbocharger, and/or exhaust conduit between the turbocharger and the aftertreatment component.

An example compressible material includes a metal foil, and particularly a corrugated metal foil. The thickness of the foil can be determined by thermal or mechanical properties, including whether an outer skin as depicted in FIG. 1 is present in a given system. An example system includes the aftertreatment component further including a catalyst washcoat disposed on the substrate material, and may further include the catalyst washcoat disposed on a substrate side of the compressible material. The metal may be of any type suitable for the exposure to the expected exhaust temperatures and environment, including at least steel, stainless steel, and/or aluminum. Other example compressible materials include composite materials, silicone materials, and/or elastomeric materials. In certain embodiments, a high temperature silicone is utilized. For certain aftertreatment components, such as but not limited to an ammonia oxidation catalyst (AMOX) positioned downstream of an SCR catalyst, a lower temperature material may be utilized. The use of a lower temperature material may depend upon bypassing during temperature based regeneration events, and/or upon the type of regeneration and the actual regeneration tactic utilized. For example, where a sulfur regeneration is performed offline as a service event, a lower temperature material may be utilized as the compressible material.

In various embodiments, the compressible material substantially surrounds the outer surface of the aftertreatment substrate. The compressible material may comprise a variety of other materials. Such compressible materials may be engineered to have a flexible cellular structure or to include polymeric matrices. Examples of such materials include, but are not limited to, foams and elastomers. Polymeric materials used for the compressible material may comprise either thermoset or thermoplastic and may be organic (e.g., polyimides, polysulfones, polyether-ether ketones, perfluoroelastomers, etc.,), inorganic (e.g., polysiloxanes) or organic-inorganic hybrids (e.g., carboranylenesiloxane). By use of the term "thermoset," a material is intended which will not melt or re-melt once it is cured. In addition to being compressible, such materials may also have a tendency to be substantially non-slidable. High-temperature plastics and various rubberized materials (i.e., flexible, stretchable polymer coated textiles or the like) may be particularly useful in this regard, although the precise types of materials are not necessarily limited to the foregoing.

The compressible materials referred to herein may be attached to the ceramic substrate via a variety of processes, including co-extrusion (discussed further herein), resin transfer molding or by coating the polymer on to the outer surface of ceramic substrate. Also, a pre-polymer or a partially polymerized material may be applied to the outer surface of the ceramic substrate, after which polymerization may be completed with the application of heat, UV light and/or a chemical accelerator either before or during the canning process.

The compressible material may undertake a plurality of functions for the aftertreatment component. By way of example, the compressible material may serve to hold the aftertreatment substrate (e.g., the catalyst in certain implementations) in place and in the proper position, and it may also protect the aftertreatment substrate from potential damage, for example due from environmental conditions or debris that are external to the aftertreatment component. The compressible material may also "take up slack" when the aftertreatment substrate expands and contracts, for example due to large fluctuations in temperature.

An example system includes the aftertreatment component having an outer skin, the outer skin defining the compressible material. Where present, in certain embodiments the outer skin at least partially compresses the compressible material and/or applies a selected closure force to the substrate through the compressible material. An example system includes the compressible material in tension, and/or (when corrugated materials are used) the corrugations at least partially compressed. For example, when corrugated material is used as the compressible material, the corrugated material may be, in fully corrugated form, slightly smaller than the substrate. Where the compressible material forms a continuous circumference (either as originally formed or by later attachment such as welding), the slightly smaller compressible material can be stretched to fit the substrate, thereby putting the compressible material into tension, and/or providing for a selected closure pressure or force to the substrate.

The schematic flow description which follows, provides an illustrative embodiment of performing procedures for manufacturing and/or using an aftertreatment component. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

An example procedure for manufacturing and/or using the aftertreatment component is depicted in FIG. 2. At 200 in FIG. 2, an operation is conducted to pass a heated exhaust stream into a catalyst substrate, thermally expanding the catalyst substrate into a compressible material defining the catalyst substrate. At 205, the compressible material is at least partially compressed. When the compressible material includes corrugations, at least partially compressing corrugations includes any operation that compresses at least a portion of the corrugations. Such operations may include an operation that deforms (plastically, permanently, or mixed) one or more corrugations from an original shape, an operation that renders a vertical dimension of a corrugation to be shorter than an initial vertical dimension, an operation that renders a horizontal dimension of a corrugation to be wider or narrower than an initial horizontal dimension, and/or an operation that stores an amount of potential energy (e.g. through spring action) into one or more corrugations. As utilized for the purposes of determining compression of a corrugation, vertical references a dimension in the direction of a radial line out from the center of the aftertreatment component, and horizontal references a dimension parallel to the circumference of the aftertreatment component.

At 210 in FIG. 2, an operation is conducted to confine the compressible material within an outer skin defining the compressible material. Defining, as used herein, should be understood broadly. An example first object defining a second object includes the second object being positioned completely within the geometric boundaries of the first object. Another example first object defining a second object includes relevant portions of the second object being positioned completely within the geometric boundaries of the first object.

At 215 in FIG. 2, the catalyst substrate is positioned within the compressible material. At 220, a catalyst washcoat is applied to the catalyst substrate after the positioning. The utilization of a compressible material, such as a corrugated metal sheet, allows the application of a catalyst washcoat after the application of the corrugated material. Accordingly, additional manufacturing processes are enabled, manufacturing processes can be simplified, and/or the surface of the compressible material can be included in the catalytically active area of the aftertreatment component. All of these options differentiate a compressible material from the use of a ceramic fiber mat. At 225, at least a portion of the catalyst washcoat may be applied to a substrate side of the compressible material.

In an alternative to the process depicted in FIG. 2, it is also possible to have the combination of catalyst substrate and the compressible material formed through a co-extrusion process. In coextrusion multiple materials would be passed through one or more dies to produce, at the same time, the catalyst substrate and the compressible materials. In some implementations, the catalyst substrate and the compressible material are co-extruded through the same die. In other implementations, two dies may operate in unison for the separate co-extrusion of the catalyst substrate and the compressible material.

As is evident from the figures and text presented above, a variety of embodiments according to the present disclosure are contemplated.

An example set of embodiments is a system including a cylindrical aftertreatment substrate material and a corrugated material coupled to the cylindrical aftertreatment substrate material. An example corrugated material includes a metal foil. An example system includes the aftertreatment component further including a catalyst washcoat disposed on the substrate material, and may further include the catalyst washcoat disposed on a substrate side of the corrugated material.

An example system includes the aftertreatment component having an outer skin, the outer skin defining the corrugated material, at least partially compresses the corrugated material, and/or applying a selected closure force to the substrate through the corrugated material. An example system includes the corrugated material in tension, and/or the corrugations at least partially compressed. In certain embodiments, the system includes the corrugated material applying a selected closure force to the substrate.

An example set of embodiments is a method including passing a heated exhaust stream into a catalyst substrate, thermally expanding the catalyst substrate into a corrugated material defining the catalyst substrate, and thereby at least partially compressing corrugations of the corrugated material. Certain further embodiments of the method are also described following. An example method includes confining the corrugated material within an outer skin defining the corrugated material. An example method includes positioning the catalyst substrate within the corrugated material, and applying a catalyst washcoat to the catalyst substrate after the positioning.

An example method further includes applying at least a portion of the catalyst washcoat to a substrate side of the corrugated material.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An aftertreatment component for an exhaust gas aftertreatment system, the aftertreatment component comprising:
   a shell;
   a ceramic substrate at least partially positioned within the shell; and
   a cylindrical sleeve comprising corrugations, the cylindrical sleeve positioned between the shell and the ceramic substrate such that the corrugations contact the shell and the ceramic substrate, the corrugations being co-extruded with the ceramic substrate or molded with the ceramic substrate;
   wherein the corrugations comprise at least one of a thermoset material, a rubberized material, a plastic material, a thermoplastic material, a polymeric material, a silicone material, an elastomeric material, or a foam material.

2. The aftertreatment component of claim 1, further comprising a catalyst layer applied to the ceramic substrate and the corrugations.

3. The aftertreatment component of claim 1, wherein:
   the corrugations maintain the ceramic substrate within the shell;
   the corrugations facilitate thermal expansion of the ceramic substrate within the shell; and
   the corrugations facilitate thermal contraction of the ceramic substrate within the shell.

4. The aftertreatment component of claim 1, wherein the cylindrical sleeve has a melting point that is greater than 700° C.

5. The aftertreatment component of claim 1, wherein the cylindrical sleeve surrounds the ceramic substrate.

6. The aftertreatment component of claim 1, wherein:
   each of the corrugations extends from the ceramic substrate;
   the ceramic substrate is positioned within the shell such that the corrugations are compressed; and
   the ceramic substrate and the cylindrical sleeve are formed by co-extrusion.

7. The aftertreatment component of claim 6, wherein:
   compression of the corrugations maintains the ceramic substrate and the cylindrical sleeve within the shell;
   the corrugations facilitate thermal expansion of the ceramic substrate within the shell; and
   the corrugations facilitate thermal contraction of the ceramic substrate within the shell.

8. The aftertreatment component of claim 6, wherein the cylindrical sleeve has a maximum temperature that is greater than 700° C.

9. The aftertreatment component of claim 6, wherein the corrugations surround an outer surface of the ceramic substrate.

10. The aftertreatment component of claim 1, wherein each of the corrugations comprises the foam material.

11. The aftertreatment component of claim 1, wherein each of the corrugations comprises the elastomeric material.

12. The aftertreatment component of claim 1, wherein each of the corrugations comprises the silicone material.

13. The aftertreatment component of claim 1, further comprising a pre-polymer material;
wherein the ceramic substrate comprises an outer surface;
wherein the pre-polymer material is applied to the outer surface;
wherein each of the corrugations is polymerized with the pre-polymer material; and
wherein the ceramic substrate and the cylindrical sleeve are positioned within the shell such that the corrugations are compressed.

14. The aftertreatment component of claim 13, wherein:
compression of the corrugations maintains the ceramic substrate and the cylindrical sleeve within the shell;
the corrugations facilitate thermal expansion of the ceramic substrate within the shell; and
the corrugations facilitate thermal contraction of the ceramic substrate within the shell.

15. The aftertreatment component of claim 1, wherein each of the corrugations comprises the thermoplastic material.

16. The aftertreatment component of claim 1, wherein each of the corrugations comprises at least one of the rubberized material or the plastic material.

17. The aftertreatment component of claim 1, further comprising a partially polymerized material;
wherein the ceramic substrate comprises an outer surface;
wherein the partially polymerized material is applied to the outer surface;
wherein each of the corrugations is polymerized with the partially polymerized material; and
wherein the ceramic substrate and the cylindrical sleeve are positioned within the shell such that the corrugations are compressed.

* * * * *